United States Patent [19]

Johnson

[11] Patent Number: 5,482,048
[45] Date of Patent: Jan. 9, 1996

[54] SYSTEM AND METHOD FOR MEASURING AND QUANTITATING FACIAL MOVEMENTS

[75] Inventor: Peter C. Johnson, Pittsburgh, Pa.

[73] Assignee: University of Pittsburgh, Pittsburgh, Pa.

[21] Appl. No.: 85,283

[22] Filed: Jun. 30, 1993

[51] Int. Cl.⁶ .......................... G06F 159/00; G06K 9/00
[52] U.S. Cl. .................... 128/665; 128/774; 128/782; 382/128
[58] Field of Search .................. 364/413.13, 413.02, 364/413.27; 382/6, 51; 128/665, 774, 782

[56] References Cited

U.S. PATENT DOCUMENTS

| | | | |
|---|---|---|---|
| 4,197,855 | 4/1980 | Lewin | 128/653 |
| 4,528,627 | 7/1985 | Coben | 364/413.28 |
| 4,600,281 | 7/1986 | Bloomstein | 352/50 |
| 4,644,582 | 2/1987 | Morishita et al. | 382/6 |
| 4,791,581 | 12/1988 | Ohba | 364/521 |
| 4,827,532 | 5/1989 | Bloomstein | 381/41 |
| 4,885,702 | 12/1989 | Ohba | 364/521 |
| 4,899,393 | 2/1990 | Morishita et al. | 382/6 |
| 4,949,286 | 8/1990 | Ohba | 364/521 |
| 5,008,947 | 4/1991 | Yamada | 382/6 |
| 5,148,477 | 9/1992 | Neeley et al. | 382/6 |
| 5,214,711 | 5/1993 | Neeley et al. | 382/6 |

OTHER PUBLICATIONS

R. Balliet, Manuel of Physical Therapy, Ch. 5, "Facial Paralysis and Other Nervomuscular Dysfunctions of the Peripheral Nervous Syst." (1989).
J. House, *Facial Nerve Grading Systems*, 93 Laryngoscope 1056 (1983).
J. House, D. Brackmann, *Facial Nerve Grading System*, 93 Otolaryngology—Head and Neck Surgery 146 (1985).
D. Brachmann, D. Barrs, *Assessing Recovery of Facial Function Following Acoustic Neuroma Surgery*, 92 Otolaryngology—Head and Neck Surgery 88 (1984).
R. Balliet, Manual of Physical Therapy, Ch. 5, *Facial Paralysis and Other Neuromuscular Dysfunctions of the Peripheral Nervous System*, 175 (1989).
C. Jansen, P. DeVriese, F. Jennekens, H. Wignne, *Lip–Length and Snout Indices in Bell's Palsey: A Comparison With The House Grading System*, 111 Acta Otolaryngology 1965 (1991).
S. Burres, *Facial Biomechanics: The Standards of Normal*, 95 Laryngoscope 708 (1985).
N. Peckitt, R. Walker, G. Barker, *The Facial Nerve Function Coefficient: Analysis of 100 Normal Subjects*, 50 J. Oral Maxillofac. Surg. 338 (1992).
R. Manktelow, J. Paletz, C. Guest, *Quantitative Assessment of Smile Reconstruction in Facial Paralysis*, 1991 Third Vienna Muscle Symposium 211.

*Primary Examiner*—Gail O. Hayes
*Assistant Examiner*—Gita D. Shingala
*Attorney, Agent, or Firm*—Reed Smith Shaw & McClay

[57] ABSTRACT

A system and method for measuring and quantitating facial movements useful in detecting, characterizing and treating facial paralysis or abnormal facial movements. A preferred embodiment of the system comprises a plurality of markers applied to a plurality of facial zones, apparatus for recording images of the marked face at repose and for recording images of the marked face at selected maximal facial movements, apparatus for assigning location coordinates to the markers of each recorded facial image, apparatus for converting location coordinates of each marker of each facial image to actual positions on the face, apparatus for determining the change in actual marker position on the face at each selected maximal facial movement and apparatus for displaying the actual marker position changes for each selected facial movement. A preferred embodiment of the method comprises the steps of applying a plurality of markers to a plurality of facial zones, recording images of the marked face at repose and recording images of the marked face at selected maximal facial movements, assigning location coordinates to the markers of the facial images, converting the location coordinates of each marker to actual positions on the face, determining the change in actual marker position for each selected maximal facial movement, and displaying the actual positional changes of each marker for each selected facial movement.

29 Claims, 13 Drawing Sheets

Repose

Brow Lift

Eye Closure

Smile

Frown
(Jaw Open)

Whistle

Frown
(Jaw Closed)

3

4

5

7

7.5

SYSTEM AND METHOD FOR MEASURING AND QUANTITATING FACIAL MOVEMENTS

The United States government has rights in this invention pursuant to the National Institute of Health Grant No. HL45891-03 entitled "Local Antithrombotic Agents In Microvascular Surgery."

FIELD OF INVENTION

The present invention generally relates to systems and methods for measuring and quantitating facial movements, and particularly to a system and method for measuring and quantitating facial movements within zones relevant to facial nerve function.

BACKGROUND OF THE INVENTION

Persons having facial nerves or muscles damaged by disease or injury oftentimes suffer from varying degrees of facial paralysis or abnormal facial movements, such as synkinesis (involuntary or inappropriate facial motion associated with voluntary facial motion), contracture or hemifacial spasms. Treatment of facial paralysis and abnormal facial movements may include physical therapy, neurotrophic drugs and/or reconstructive surgery. Measuring and quantitating facial movements is useful in detecting, characterizing and treating facial paralysis or abnormal facial movements. Quantitative information is also helpful in evaluating facial symmetry and planning reanimation procedures.

Several ordinal methods exist for qualifying facial movements. Most notably is the John W. House, M.D. facial nerve grading system ("House Scale"), based on prior facial grading systems, which provides a gross scale using six grades (I–VI) to subjectively categorize overall facial function. See, J. House, *Facial Nerve Grading Systems*, 93 Laryngoscope 1056 (1983), the disclosure of which is incorporated herein by reference. Table 1 sets forth the House Scale definitions of varying degrees of facial function corresponding to the six grades. Secondary facial defects such as synkinesis, mass action and hemifacial spasms are also considered and included in the overall grading of facial movement.

Under the House Scale, evaluation of a patient is expressed as a fraction where the numerator is the patient's score and the denominator is the maximum possible score. Thus, a patient with moderately severe facial dysfunction will have a score of IV/IV.

The House Scale also includes a method for measuring facial movement to assist an investigator in placing a patient in the proper grade. See, J. House, D. Brackmann, *Facial Nerve Grading System*, 93 Otolaryngology—Head and Neck Surgery 146 (1985), the disclosure of which is incorporated herein by reference. Specifically, the patient's eyebrow movement and movement of the corner of the mouth on the affected side of the face is measured and then compared to the measured movements on the unaffected side of the face. A one centimeter scale having 0.25 centimeter divisions is used to measure the movements for a total possible score of 8 (4, or 1 centimeter for the mouth and 4, or 1 centimeter, for the eyebrow). As shown in Table 2, the numeric scores are converted to the six grade scale. This method for measuring facial movement is similar to the method proposed by Derald E. Brackmann, M.D., and David M. Barrs, M.D. See, D. Brackmann, D. Barrs, *Assessing Recovery of Facial Function Following Acoustic Neuroma Surgery*, 92 Otolaryngology—Head and Neck Surgery 88 (1984), the disclosure of which is incorporated herein by reference.

TABLE 2

| Grade | Description | Measurement | Function (%) | Estimated function (%) |
|---|---|---|---|---|
| I | Normal | 8/8 | 100 | 100 |
| II | Slight | 7/8 | 76–99 | 80 |
| III | Moderate | 5/8–6/8 | 51–75 | 60 |
| IV | Moderately severe | 3/8–4/8 | 26–50 | 40 |
| V | Severe | 1/8–2/8 | 1–25 | 20 |
| VI | Total | 0/8 | 0 | 0 |

The International Assessment Scale, based on the House Scale, was adopted at the Fifth International Symposium on the Facial Nerve in Bordeaux in 1984. This Scale uses six grades (I–VI) similar to the grades of the House Scale to subjectively categorize overall facial function. See, R. Balliet, Manual of Physical Therapy, Ch. 5, *Facial Paralysis*

TABLE 1

| Grade | | Definition |
|---|---|---|
| I. | Normal | Normal facial function in all areas. |
| II. | Mild dysfunction | Slight weakness noticeable only on close inspection. At rest: normal symmetry and tone. Motion: some to normal movement of forehead; ability to close eye with minimal effort and slight asymmetry; ability to move corners of mouth with maximal effort and slight asymmetry. No synkinesis, contracture or hemifacial spasm. |
| III. | Moderate dysfunction | Obvious but not disfiguring difference between two sides; no functional impairment; noticeable but not severe synkinesis, contracture and/or hemifacial spasm. At rest: normal symmetry and tone. Motion: slight to no movement of forehead; ability to close eye with maximal effort and obvious asymmetry; ability to move corners of mouth with maximal effort and obvious asymmetry. Patients with obvious but not disfiguring synkinesis, contracture, and/or hemifacial spasm are Grade 3 regardless of degree of motor activity. |
| IV. | Moderately severe dysfunction | Obvious weakness and/or disfiguring asymmetry. At rest: normal symmetry and tone. Motion: no movement of forehead; inability to close eye completely with maximal effort; asymmetrical movement of corners of mouth with maximal effort. Patients with synkinesis, mass action, and or hemifacial spasm severe enough to interfere with function are Grade 4 regardless of degree of motor activity. |
| V. | Severe dysfunction | Only barely perceptible motion. At rest: possible asymmetry with droop of corner of mouth and decreased or absent nasal labial fold. Motion: no movement of forehead; incomplete closure of eye and only slight movement of lid with maximal effort; slight movement of corner of mouth. Synkinesis, contracture, and hemifacial spasm usually absent. |
| VI. | Total paralysis | Loss of tone; asymmetry; no motion; no synkinesis, contracture, or hemifacial spasm. |

*and Other Neuromuscular Dysfunctions of the Peripheral*

*Nervous System*, 175, 181 1989, the disclosure of which is incorporated herein by reference.

The University of Wisconsin Facial Paralysis Clinical Assessment Scale (the "Wisconsin Scale"), is a more complicated assessment scale requiring estimates of voluntary and spontaneous facial movement, and resting facial tone as a percentage of normal facial movement. See, Balliet, supra, at 183. These estimates are difficult to make, but electromyographic measurements of the facial movements and resting tone generally improve the accuracy of the assessment. Synkinesis is also graded on a scale of zero to four (none to severe) and other muscle responses, such as tics and spasms are noted. The estimates for the voluntary and spontaneous facial movements and resting tone are averaged and weighted relative to importance and then added. The resulting scores are compared to other assessment scales, such as the International Assessment Scale. Analyzing facial movements based on the Wisconsin Scale is complicated, time consuming and expensive.

The House Scale and its modifications are useful because they provide a global clinical evaluation of dynamic facial movement which is readily communicable between clinicians. These ordinal scales, however, fail to quantitate actual facial movements, measure the movement vector for reanimation procedures and provide a means for storing facial movement data. Further, these scales remain limited in that they are dependent upon the investigator's perception to recognize facial defects and analyze the patient's disability.

Quantitative methods for assessing facial motion have also been developed. For example, Jansen et al. developed a lip-length index which measures the difference between the intercommissural distances of the lips at rest and after maximal smile and a snout index which measures the difference between the intercommissural distances of the lips at rest and after maximal pucker. See, C. Jansen, P. DeVriese, F. Jennekens, H. Wijnne, *Lip-Length and Snout Indices in Bell's Palsy: A Comparison With The House Grading System*, 111 Acta Otolaryngology 1965 (1991), the disclosure of which is incorporated herein by reference. These indices are continuous variables suitable for statistical evaluation. Further, a high correlation exists between the indices and the House Scale suggesting that these assessment tools are complementary. The lip-length and snout indices, however, are limited in that they only provide information pertaining to peri-oral function.

Steven A. Burres, M.D., derived three parameters of facial function based on linear measurements of skin landmarks and integrated electromyography ("EMG") of facial musculature to quantify facial movement. See, S. Burres, *Facial Biomechanics: The Standards of Normal*, 95 Laryngoscope 708 (1985), the disclosure of which is incorporated herein by reference. Specifically, Burres measured the facial movements of thirty subjects using calipers and electromyography to derive (1) the Linear Measurement Index ("LMRI") (proportional to maximum force), (2) EMG symmetry (level of integrated EMG compared to unaffected side), and (3) Peak Electromechanical Ratio ("PEMR") (correlation of motor unit electrical activity with motion). Further, Buttes concluded that a linear relationship exists between log integrated EMG and percent displacement of skin landmarks. This relationship is defined as the "normal" standard against which data from patients can be plotted and judged. This system of evaluating facial motion, however, is extremely complicated and time consuming, and requires expensive EMG equipment and highly trained observers.

The Facial Nerve Function Index ("FNFI") was derived by Peckitt et al. by examining facial movement of 100 normal subjects and measuring on each side of the face the change in distance between the outer canthus of the eye and the lateral commissure of the mouth at rest and when smiling. See, N. Peckitt, R. Walker, G. Barker, *The Facial Nerve Function Coefficient: Analysis of 100 Normal Subjects*, 50 J. Oral Maxillofac. Surg. 338(1992), the disclosure of which is incorporated herein by reference. The FNFI, however, produces a skewed distribution making the FNFI awkward to interpret and limited in its usefulness to evaluate facial motion improvement. The Facial Nerve Function Coefficient ("FNFC") was subsequently formulated to provide a more symmetrical distribution of the FNFI with a more narrow reference range for evaluating facial movement recovery. The FNFC, however, is limited in that it does not provide for quantitation of a wide range of facial movements.

Manktelow et al. proposed a method for measuring facial movements during smile to assist a surgeon in assessing the results of facial reconstructive surgery. See R. Manktelow, J. Paletz, C. Guest, *Quantitative Assessment of Smile Reconstruction in Facial Paralysis*, 1991 Third Vienna Muscle Symposium 218, the disclosure of which is incorporated herein by reference. This method involves measuring the change in distance during smile between a selected fixed point on the face and the commissure or the mid-lateral point on the upper lip.

None of these quantitative methods, however, simultaneously measure facial movement in all facial zones under circumstances designed to provide the maximal, voluntary recruitment of neuromuscular units with the remainder of the face at rest (i.e. conditions which enable the detection and quantitation of synkinesis and/or normal associated movements, when present).

SUMMARY OF THE INVENTION

The system and method of the present invention provide an outcome assessment tool that measures and quantitates facial movements to assist in detecting, characterizing and treating facial paralysis or abnormal facial movements. The system and method of the present invention are also helpful in evaluating facial symmetry and planning reanimation procedures.

A preferred system of the invention comprises a plurality of markers, such as adhesive dots, applied to several facial zones of a patient, including, but not limited to, the radix, philtrum, mentum, left supraorbital, right supraorbital, left infraorbital, right infraorbital, left oral commissure and right oral commissure. The system further preferably includes a calibration ruler attached to the tip of the patient's nose and a reference marker applied to the nose behind and partially above the calibration ruler so that the reference marker partially appears above the calibration ruler when the face is viewed head-on.

In a preferred system, a camera capable of recording images on film developed into slides is used to record facial images at repose and at selected maximal facial movements. Each facial image slide is projected onto a digitizer board so that the calibration ruler is projected to its original size.

The system further preferably includes a commercially available digitizer computer program and a data input device which is selectively aligned with each marker of each projected facial image. The data input device communicates with the digitizer board and digitizer computer program to assign actual marker positions to each marker. A commercially available computer spreadsheet adapted to determine the change in actual marker position of each marker receives the actual marker positions from the digitizer computer program. The change in actual marker position for each selected facial movement is displayed for quantitative analysis.

A preferred method for measuring and quantitating facial movements comprises the steps of centering the pupils of the face at repose and applying a marker to a plurality of facial zones, including, but not limited to, the radix, philtrum, mentum, left supraorbital, right supraorbital, left infraorbital, right infraorbital, left oral commissure and right oral commissure. A calibration ruler is positioned proximate to the tip of the patient's nose and a reference marker is applied to the nose behind and partially above the calibration ruler so that the reference marker partially appears above the calibration ruler when the face is viewed head-on.

Facial images at repose and at selected maximal facial movements are preferably recorded by a camera capable of recording images on film developed into slides. Head-on (full face) images are recorded to measure the X and Y components of facial movement, and if so desired, lateral (side of face) images are recorded to measure the Y and Z components of facial movement. Each slide is developed and projected onto a digitizer board so that the calibration ruler is projected to its original size.

A data input device is selectively aligned with each marker of each facial image and communicates with the digitizer board and a commercially available digitizer computer program to assign actual marker positions to each marker. The change in actual marker position is then calculated by a commercially available computer spreadsheet that receives the actual marker positions from the digitizer computer program. Because the distance moved by each marker is a continuous variable, the method lends itself to statistical analysis by standard techniques.

The change in actual marker position for each facial movement is displayed for analysis. In a preferred method, for each facial movement, the change in the X coordinate for each marker is plotted for analysis and the change in the Y coordinate for each marker is plotted for analysis. In the event lateral images are recorded, the change in the Z coordinate for each marker is plotted for analysis. Similarly, the change in a facial movement vector, such as the smile vector, comprising X, Y and/or Z coordinates, may be plotted over time for analysis.

The system and method of the present invention differ and are believed to be superior to the systems and methods known in the prior art because they assist in simultaneously tracking multiple points on the face, detecting small changes in facial movement over time, identifying synkinesis and other secondary facial defects, and calculating facial symmetry at repose and after facial movement. Further, the system and method of the present invention allow assessment of region-specific facial nerve function, quantitative tracking of motor recovery and determination of the direction of muscle pull. Quantitation of loss of movement after local or global facial nerve dysfunction and quantitation of return of facial movement after facial nerve injury or reanimation procedures is also provided. The system and method may also be used to detect abnormalities in conversational facial motion.

Finally, the system and method is easy to use because easily reproducible data can be collected at a patient's bedside without the use of standard cephalometric or other equipment-dependent techniques. The recorded facial images can be processed and analyzed at a later time.

DETAILED DESCRIPTION OF THE PREFERRED EMBODIMENTS

Figure 1:
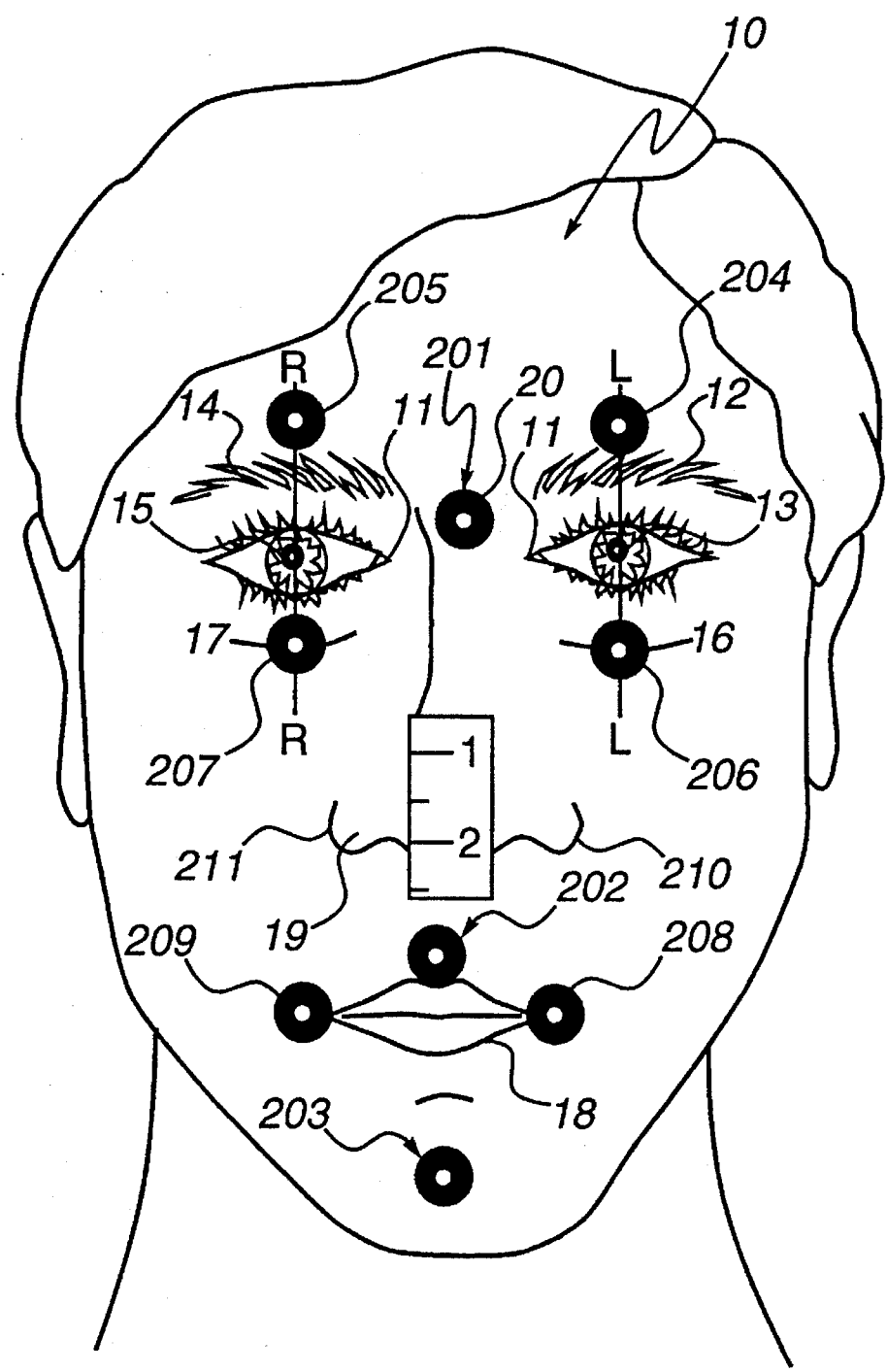
FIG. 1 shows a preferred marking and calibration ruler placement on a face at repose.

As shown in FIG. 1, the system for measuring and quantitating facial movements of the present invention includes a least one landmark or marker 20 applied to at least one selected zone of a patient's face 10 at repose.

The marker 20 may be an adhesive dot, a mark made by a grease pencil or other marking means (not shown), or a light emitting diode (not shown). In a preferred embodiment, a plurality of markers 201–209 are applied to the following facial zones:

1. The radix 201 identified at the deepest depression of the nasofrontal junction directly over the midline of the nasal bridge. It is noted that the radix 201 is not necessarily at the midpoint between the medial canthi 11 of the patient's eyes;

2. The philtrum 202 identified at the distal philtral depression and abutting the vermilion border of mouth 18;

3. The mentum 203 identified at the most central portion of the chin (both horizontally and vertically) which is located by an observer who, from a distance, makes a visual integration of the soft tissue prominence of the chin;

4. Left supraorbital 204 identified at the intersection of the superior border of the left eyebrow 12 and a left vertical transpupillary line L—L passing through the center of the left pupil 13. The left vertical transpupillary line L—L is identified when the patient is staring straight ahead at infinity. The marker is applied so that its inferior border abuts the hair of the left eyebrow 12.

5. Right supraorbital 205 identified at the intersection of the superior border of the right eyebrow 14 and a right vertical transpupillary line R—R passing through the center of the right pupil 15. The right vertical transpupillary line R—R is identified when the patient is staring straight ahead at infinity. The marker is applied so that its inferior border abuts the hair of the right eyebrow 14.

6. Left infraorbital 206 identified at the intersection of the left vertical transpupillary line L—L and the left infraorbital rim 16, as determined by the observer through palpation.

7. Right infraorbital 207 identified at the intersection of the right vertical transpupillary line R—R and the right infraorbital rim 17, as determined by the observer through palpation.

8. Left commissure 208 identified at the left corner of the mouth 18 at the vermilion edge.

9. Right commissure 209 identified at the right corner of the mouth 18 at the vermilion edge.

It is understood that markers 20 may be applied to other facial zones, including but not limited to, the left nasal labial fold 210 and the right nasal labial fold 211. Also, to obtain a more discriminate analysis of perioral motion, markers 20 may be applied to multiple sites around the lips of mouth 18.

To ensure proper placement of the markers 201–209, the patient is seated directly in front of the observer and asked to look straight ahead "through" the observer so as to centralize the pupils 13 and 15, respectively.

FIG. 1 also shows that the system of the invention further includes a calibration ruler 30 attached to the tip of the nose 19 by any suitable attaching means, such as soft plastic tape (not shown). Care must be taken to ensure that the calibration ruler 30 is attached in a generally vertical position on the tip of the nose 19 to prevent photographic distortions that may occur while recording facial images. The calibration ruler 30 includes at least one calibration unit, such as one centimeter. In a preferred embodiment of the system, the calibration ruler 30 is a two centimeter ruler.

The system of the invention further includes a reference marker 32 placed on the nose 19 behind and partially above the calibration ruler 30. In a preferred embodiment, the reference marker 32 is a generally circular adhesive dot, which, from a head-on view of the patient, appears as a sunrise over the calibration ruler 30. The patient is advised of the need to maintain his face in a centered pose, which is continuously checked by the observer by verifying that the calibration ruler 30 remains generally vertical and the reference marker 32 continues to appear as a sunrise over the top of the calibration ruler 30 at the same horizontal and vertical positions relative to the ruler 30.

Apparatus for recording the patient's facial image at repose and at selected facial movements is also included in the present invention. In a preferred embodiment, the apparatus includes readily available photographic equipment (not shown) which is capable of capturing facial images on photographs or slides. In another preferred embodiment of the invention, the recording apparatus includes video equipment capable of recording facial images on videotape. In yet another preferred embodiment of the invention, the recording apparatus includes a compact disc camera capable of recording facial images on compact disc or other digitally based media.

After markers 201–209 are placed on the patient's face 10, the observer records a baseline image of the patient's face 10 at repose. The patient is then advised to maintain his face 10 in a relaxed posture so that selected region-specific facial movements can be recorded. Head-on (full face) images are recorded to analyze the X and Y components of facial motion. Lateral (side of face) images are recorded to analyze Y and Z components of facial motion. Further, facial motion vectors comprising X, Y and/or Z components of facial motion can be derived from the head-on and lateral facial images.

To minimize any distortion in the recorded facial images, it is important that each facial image be focused on the calibration ruler 30. As illustrated in FIG. 3, the patient's face may be recorded in the following facial movements:

1. Maximal brow lift;
2. Maximal eye closure;
3. Maximal smile;
4. Maximal frown; and
5. Maximal whistle or pucker.

For each movement, the patient is asked to make only that movement and to do so in as forceful a way as possible and to maintain the movement at its maximal position of displacement. Maximal facial movement enables the observer to measure the maximal voluntarily recruited muscular response of a particular movement, a feature which is helpful in detecting the earliest stages of facial nerve or muscle recovery after injury or reconstruction with a donor muscle, including free tissue transfer. This technique also optimizes the detection of synkinesis, when present.

Further, it is important for the patient when expressing the maximal frown facial movement to keep his teeth gently together, as shown in the frown "jaw closed" movement of FIG. 3. This posture avoids frowning by opening the jaw and turning down the corners of the mouth, as shown in the "jaw open" movement of FIG. 3. The "jaw open" frown results in quantitation error, as shown in FIG. 6 and more fully described below.

Figure 2:
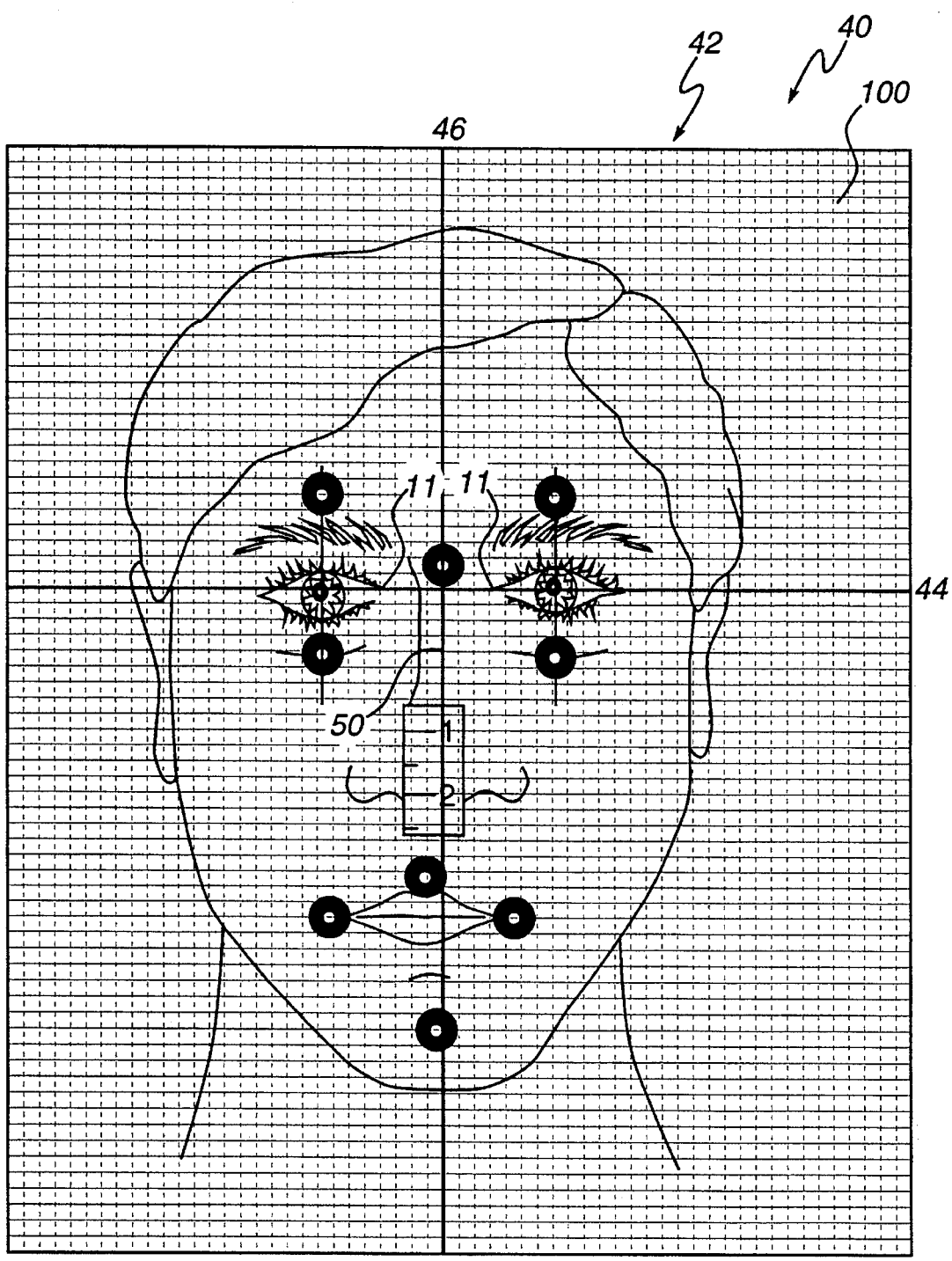
FIG. 2 shows a grid placement on a facial image of FIG. 1.
Figure 3A:
FIG. 3 shows various selected facial movements that may be evaluated by the present invention.
Figure 3B:
Figure 3C:
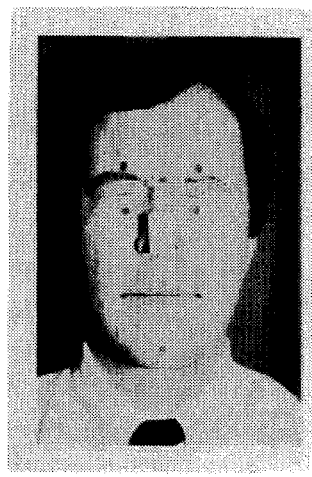
Figure 3D:
Figure 3E:
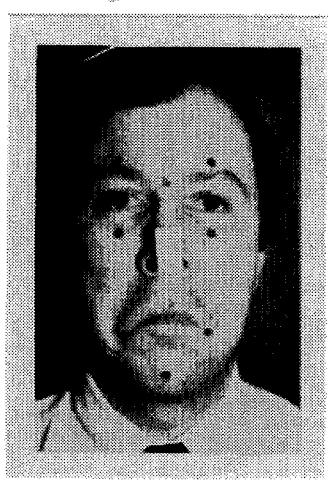
Figure 3F:
Figure 3G:
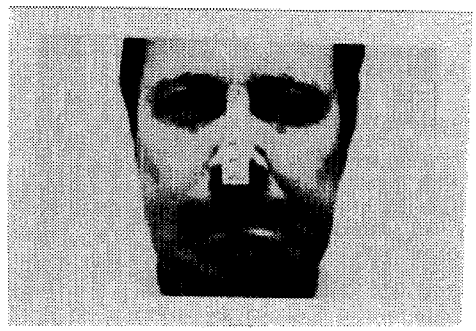

The system of the invention further includes apparatus for assigning location coordinates to each marker 201–209 in each facial image 100. In a preferred embodiment, as shown in FIG. 2, a grid 40 having a plurality of grid units 42, is juxtaposed to each facial image 100, for example, overlayed onto each facial image 100, whether captured in a photograph, or in a slide and viewed on a slide viewer, or on videotape and viewed on a television screen, or on digitally based media and viewed on a computer screen. In a preferred embodiment, the grid 40 is a black grid on transparent film. The horizontal axis 44 of the grid 40 is aligned on the facial image 100 so that it passes through the lower limbs of the medial canthi 11 of the facial image 100. The vertical axis 46 of the grid 40 is aligned on the facial image 100 so that it passes through the perceived center of the bony nasal dorsum 50 of the facial image 10. The lower limbs of the medial canthi 11 are chosen as the horizontal axis zero reference and perceived center of the bony nasal dorsum 50 is chosen as the vertical axis zero reference because of their relative immobility during facial movement.

Further, it is noted that the perceived center of the bony nasal dorsum 50 for each facial image 100 may not always correspond to the radix marker 201, since asymmetric contractions of the corrugator muscles may displace the marker 201 from the center of the nasal dorsum 50 in some facial images. Aligning the vertical axis 46 with the bony nasal dorsum 50 requires judgement on the pars of the observer which can be developed with minimal practice.

After the grid 40 has been overlayed onto each facial image 100, location coordinates, for example X and Y coordinates, are assigned to each marker 201–209 based on the grid orientation. The precision of assigning location coordinates can be enhanced significantly by using a grid 40 having a fine grid unit 42, such as a one millimeter square grid. The grid 40 is then aligned with the image of the calibration ruler 30 of each facial image 100 so as to determine the number of grid units 42 per centimeter for that particular facial image 100. This procedure internally calibrates the facial image 100. If a different number of grid units 42 per centimeter for a given set of facial images 100 is obtained, which occurs when the observer or patient move relative to one another while facial images are recorded, the location coordinates for each marker are normalized to the most common number of grid units 42 per centimeter for the patient's facial images 100.

After the facial images 100 are calibrated, the observer can mathematically convert the location coordinates of each marker to actual positions on the patient's face 10 relative to the trans-canthal, trans-nasal origin. Alternatively, a preferred embodiment of the system includes a commercially available computer spreadsheet which is adapted to convert inputted marker location coordinates of each facial image 100 into actual positions on the face. In a preferred embodiment, an adapted Excel® (Microsoft Corp.) spreadsheet which is run in Windows® (Microsoft Corp.) may be used.

Figure 4:
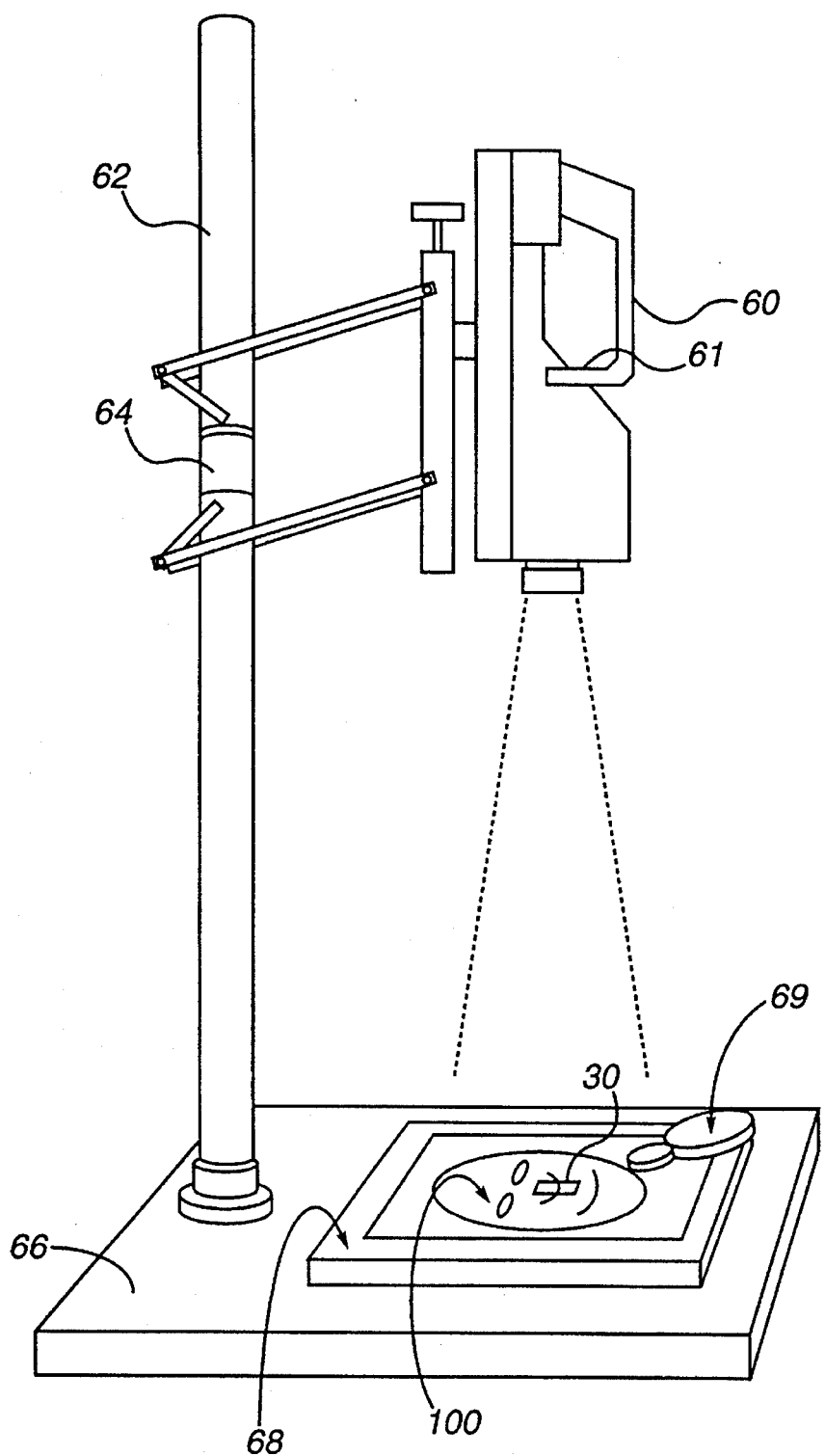
FIG. 4 shows a schematic illustration of a preferred embodiment of an apparatus for assigning marker location coordinates including a slide projector, digitizer board and data input device.
Figure 5A:
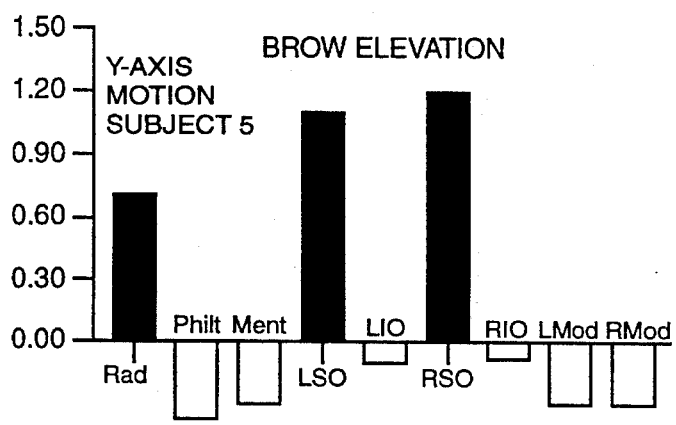
FIG. 5 shows a facial movement profile of a normal face during maximal brow elevation, maximal eye closure and maximal whistle.
Figure 5A:
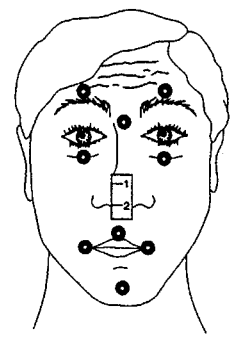
Figure 5B:
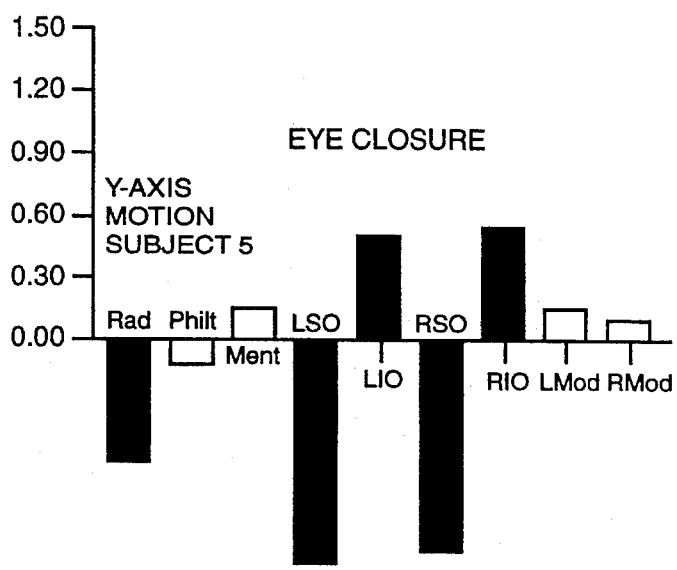
Figure 5B:
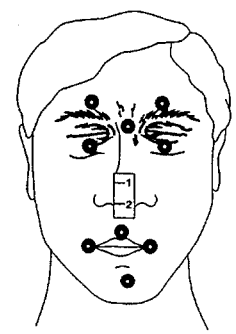
Figure 5C:
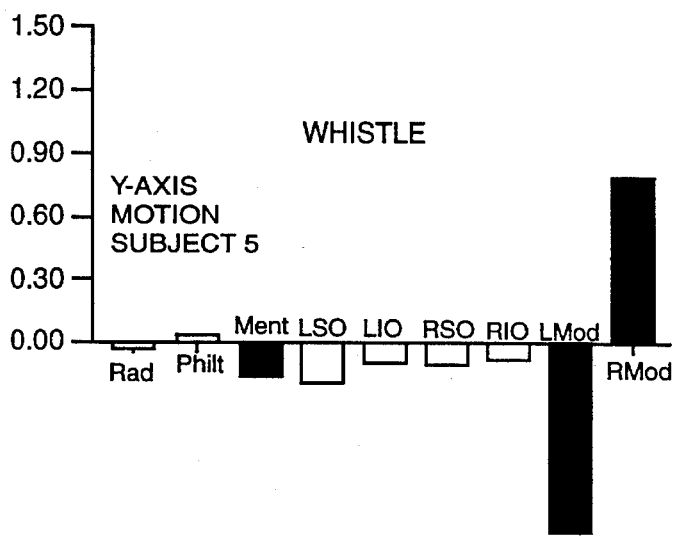
Figure 5C:
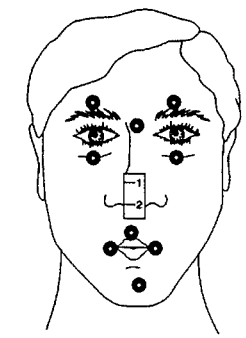
Figure 6A:
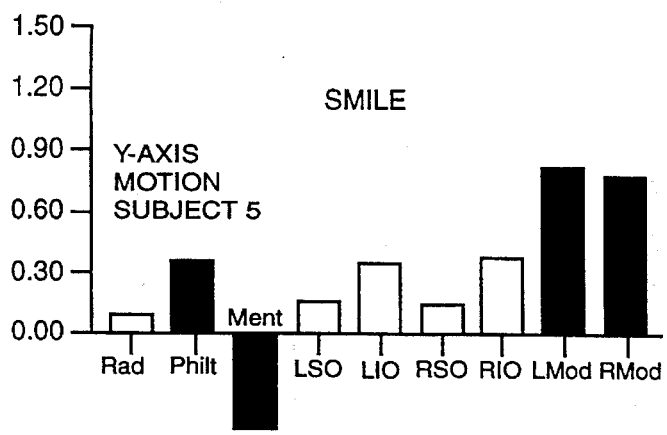
FIG. 6 shows a facial movement profile of a normal face during maximal smile and maximal frown.
Figure 6A:
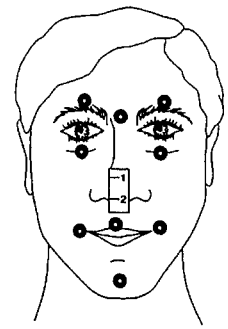
Figure 6B:
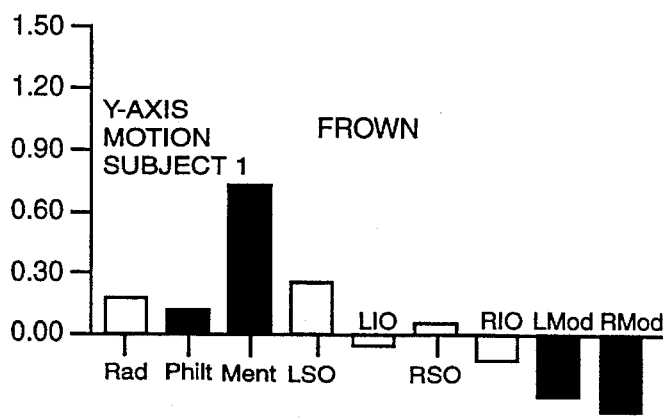
Figure 6B:
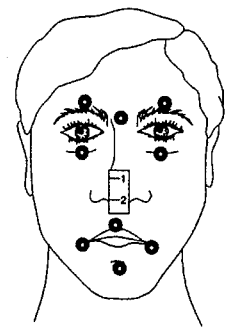
Figure 6C:
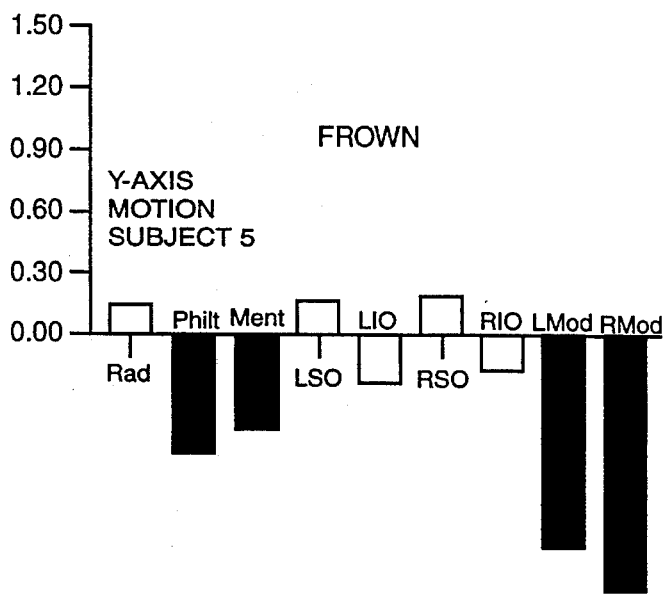

In another preferred embodiment of the invention, as shown in FIG. 4, the apparatus for assigning location coordinates to the markers 201–209 of each facial image 100 includes a slide projector 60 having a slide platform 61. The slide projector 60 is adjustably mounted by adjustment means 64 on a vertical stand 62 attached to a horizontal base 66. The apparatus further includes a digitizer board 68 mounted on the base 66 and a data input device 69, such as a mouse or hand-held computer puck, communicating with the digitizer board 68 and a commercially available digitizer computer program, such as Sigma-Scan (Jandel Scientific). Each developed slide is positioned on the slide platform 61 and projected by the adjustable slide projector 60 onto a digitizer board 68 so that the image of the calibration ruler 30 is actual size, thus normalizing the calibration ruler 30.

The previously described grid 40 is then placed over the actual size image of the face so that the X and Y axes of the grid 40 are placed through the lower limbs of the medial canthi 11 and the center of the bony nasal dorsum 50, respectively. The digitizer board 68 is then calibrated for the unique position and size of the projected facial image 100 by aligning the data input device 69 with three noncolinear points on the grid 40 so as to assign coordinates to those points.

Actual marker positions are then assigned to each marker 201–209 for each facial image 100 by the digitizer program when the observer selectively aligns the data input device 69 with each marker image projected on the digitizer board 68. The actual marker positions are then inputted into a commercially available computer spreadsheet adapted to calculate the change in marker position from repose to each selected movement. The change in the actual marker position is then displayed for quantitative analysis.

In another preferred embodiment of the invention, facial images recorded on compact disc or other digitally based media may be projected onto a computer screen (not shown) so that the image of the calibration ruler 30 is actual size, thus normalizing the calibration ruler 30. Similar to calibrating the digitizer board 68, the computer screen may be calibrated for the unique position and size of the displayed facial image 100 by overlaying onto the displayed facial image 100 the previously described grid 40 (either physically or as part of a commercially available digitizer computer program). The computer screen is then calibrated by aligning a data input device (communicating with the digitizer computer program) with three noncolinear points on the grid 40 so as to assign coordinates to those points.

Actual marker positions are then assigned to each marker 201–209 for each facial image 100 by the digitizer computer program and data input device when the observer selectively aligns the data input device with each marker image projected on the computer screen. The actual marker positions are then inputted into a commercially available computer spreadsheet adapted to calculate the change in actual marker position from repose to each selected movement. The change in actual marker position is then displayed for analysis. For example, the change in X and Y components of facial motion from head-on facial image views may be displayed for analysis, the change in Y and Z components of facial motion from lateral facial image views may be displayed for analysis, and the change in any selected facial movement vector comprising X, Y and/or Z components of facial movement may be displayed for analysis.

It is understood that each of the described embodiments of the system and the method of the present invention may also be used to detect abnormalities in conversational facial motion (i.e. facial motion without maximal facial movement).

The following examples demonstrate how the system and method of the invention are used to measure and quantitate facial movements. Quantitation of selected facial movements of the persons having normal facial function and persons having abnormal facial function are presented in the graphs of FIGS. 5–10 and FIGS. 12–14. The axes for each graph are in centimeters (unless otherwise indicated) and the reference markers 201–209 are abbreviated as follows: Rad=radix; Philt=philtrum; Ment=mentum; LSO=left supraorbital; LIO=left infraorbital; RSO=right supraorbital; RIO=right infraorbital; LMod=left modiolus (left oral commissure); and RMod=right modiolus (right oral commissure).

Quantitation of maximal facial movements for a 37 year old male having normal facial function is displayed in FIGS. 5 and 6. These figures show that the system and method of the invention is capable of differentiating expected facial movements in a given facial zone (i.e., supraorbital and radix elevation during maximal brow lift) while the remainder of the face generally shows little associated movement.

In particular, FIG. 5 shows the magnitude of the vertical (Y-axis) movement for markers after isolated maximal brow elevation and maximal eye closure. The black bars indicate the markers which would be expected to move when the desired facial movement is achieved. FIG. 5 illustrates that these movements are made with the remainder of the face at rest, as shown by the minimal movement of the other markers. In the bottom graph, the horizontal (X-axis) movement is shown for the maximal whistle facial movement. The left sided movement is negative with respect to the horizontal axis, whereas the right sided movement is in a positive direction.

In the upper two graphs of FIG. 6, marker movement is measured after isolated maximal smile and maximal frown movements. Notable features include the fall of the mentum 203 while smiling and the elevation of the mentum 203 while frowning. This movement corresponds to the relaxation and activation of the marginal mandibular nerve during these movements. The patient's inability to separate a small amount of cheek elevation from the left and right commissure movement during a smile as also shown.

Under certain circumstances such as smiling, the infraorbital markers 206 and 207 rise slightly, which indicate that the movement of the cheek is also involved during smiling. This effect is readily noticed in casual conversation. However, other associated movements in the face are of small magnitude and movements which are controlled by separate facial nerve branches can be differentiated.

The bottom graph of FIG. 6 shows that the corners of the mouth turn down excessively during the maximal frown facial movement when the jaw is opened. This "jaw open" frown posture results in quantitation error because the system of the invention measures all facial motion, not only facial motion associated with facial nerve activation. Thus, to properly measure nerve function for the maximal frown movement, the patient is asked to keep his teeth gently together to keep his jaw closed in the frown movement, as shown in FIG. 3.

Figure 7A:
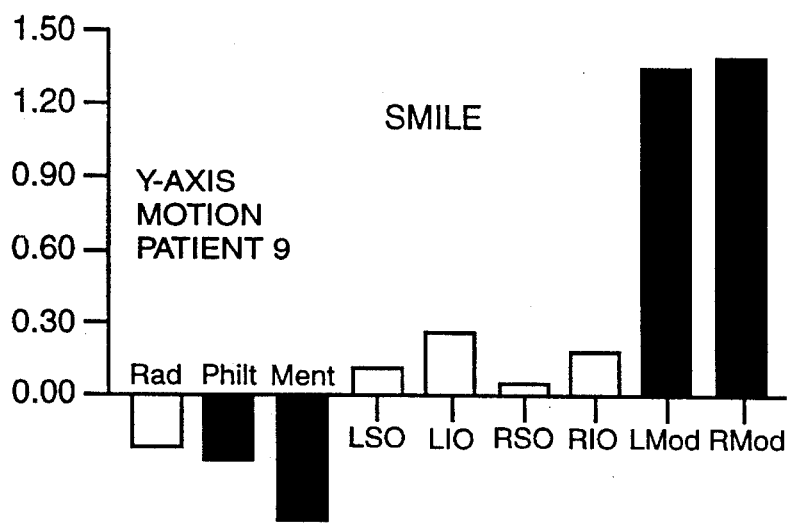
FIG. 7 shows a maximal smile and frown movement profile of a face lacking left marginal mandibular nerve function after a gunshot wound and mandibular repair.
Figure 7B:
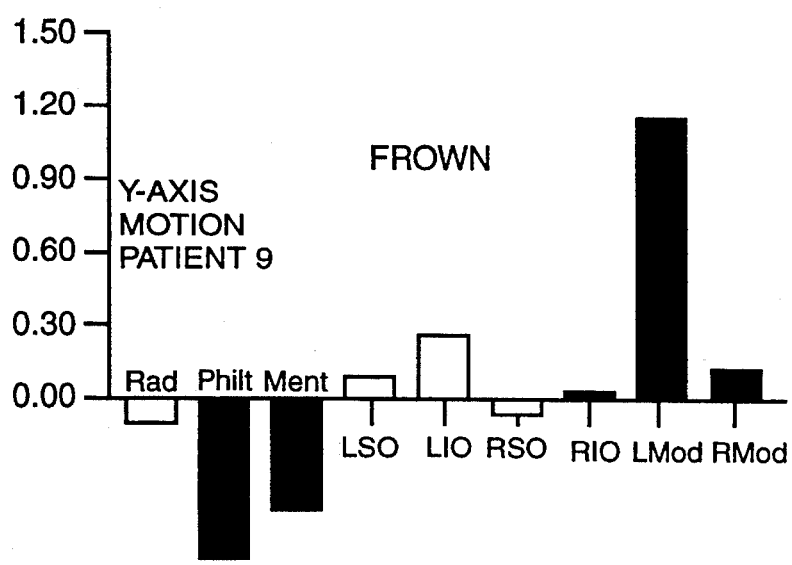
Figure 8A:
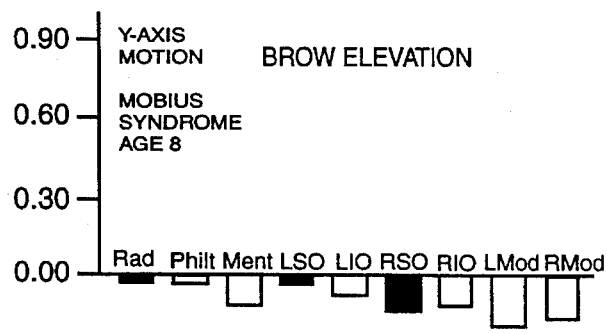
FIG. 8 shows a maximal facial movement profile of a face having a variant of Mobius syndrome exhibiting the isolated ability to smile on the left.
Figure 8B:
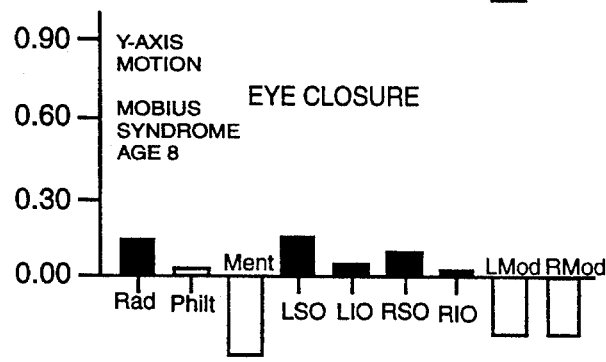
Figure 8C:
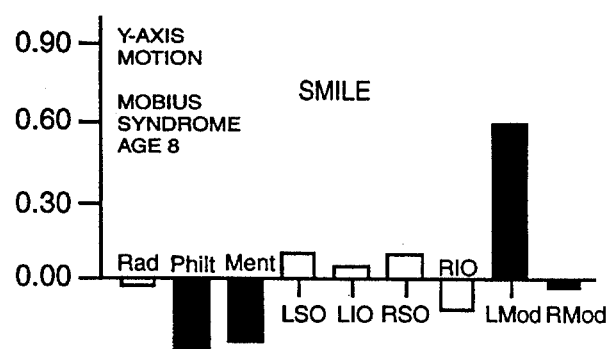
Figure 8D:
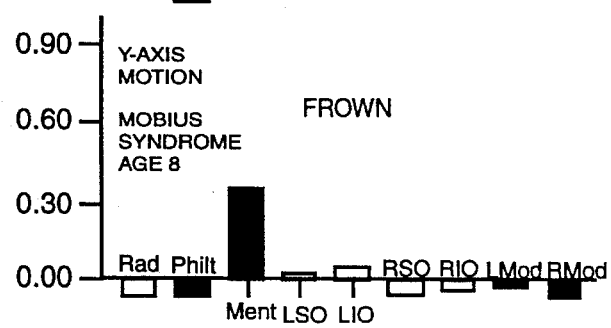
Figure 8E:
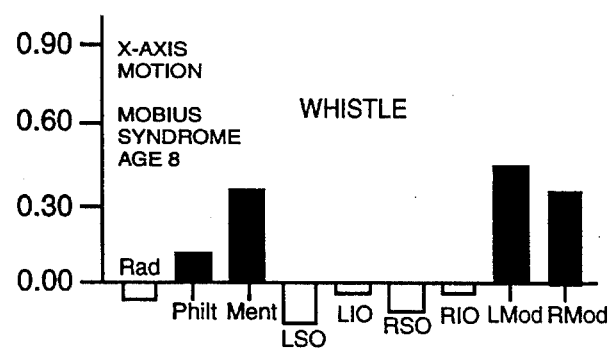

FIG. 7 illustrates the quantitation of facial movement of an 18 year old male lacking left marginal mandibular nerve function after a gunshot wound and mandibular repair. The absence of restraint of the smiling mechanism while in the frown position is shown by a comparison of the LMod and the RMod. This figure shows that the patient has a normal smile (with fall of the mentum 203) but an inability to maintain depression of the left oral commissure 208 (LMod) when frowning. This frown movement uncovers the normal antagonism of the facial muscles during a sustained movement. FIG. 7 also shows an abnormal fall of the mentum 203 during the frown movement.

In FIG. 8, facial movement data from an eight year old girl with a bilateral congenital facial palsy is shown. Her condition is a variant of Mobius syndrome with a Pierre Robin component. Her only visible facial movements on examination are a Bell's phenomenon to cover her corneas (which require only levator relaxation and activation of the superior rectus muscle) and a left-sided smile. She is also able to elevate her mentum. Otherwise her face is essentially immobile.

The top graph of FIG. 8 shows the patient's inability to raise her eyebrows. Paradoxical movement of the infraorbital markers 206 and 207 is seen during attempted eye closure, with elevation, rather than depression of the supraorbital markers 204 and 205. Significantly, the system detects her left oral commissure movement 208 and the falling of her mentum 203 normally during the smile. Note the absence of right commissural movement 209. During a frown, her mentum 203 rises, suggesting some persistence of the marginal mandibular nerve. Finally, when she attempts to whistle (X-axis movement shown) she has a paradoxical drawing away of the left oral commissure 208 from the midline, indicating her attempt to respond with the only movement she has available to her, a smile.

Figure 9A:
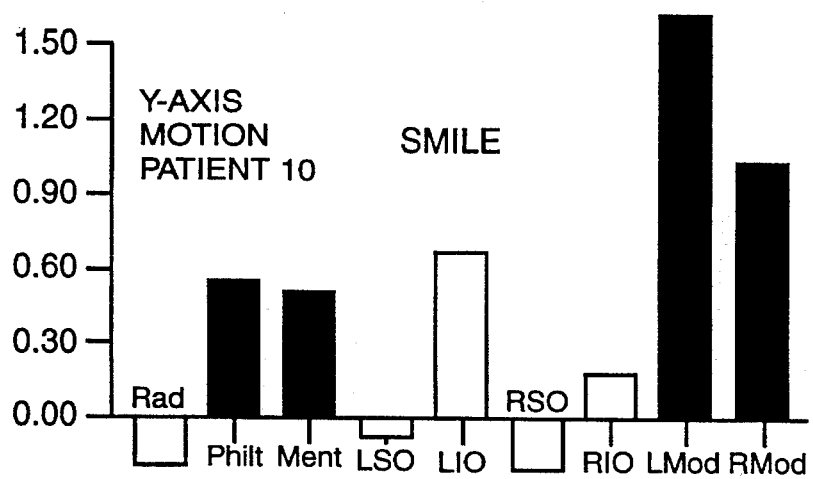
FIG. 9 shows a maximal smile and maximal eye closure movement profile detecting synkinesis in a face that sustained a laceration of the right medial face including laceration of multiple facial nerve branches nine months prior to analysis.
Figure 9B:
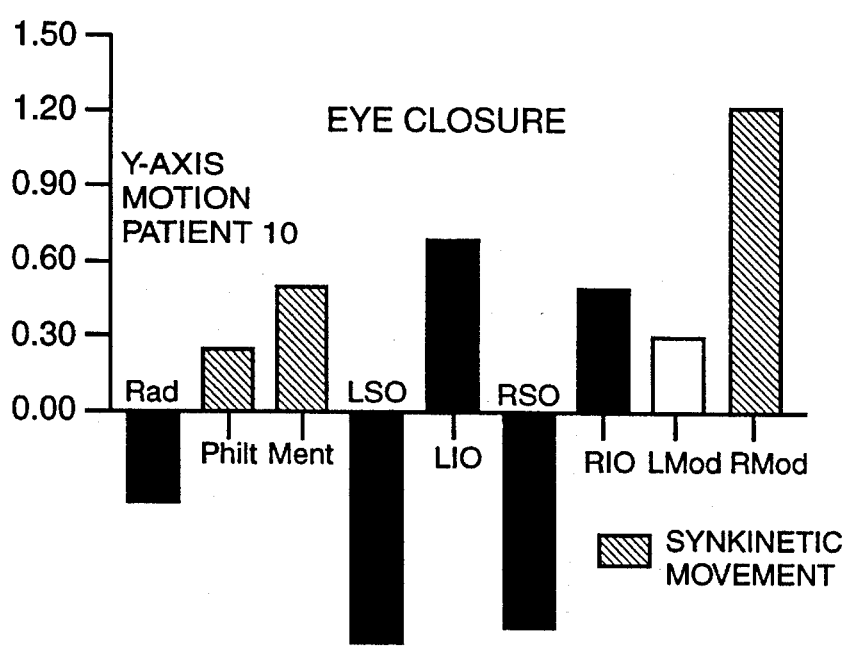

FIG. 9 depicts data from a 25 year old male patient with a recovering right lower facial palsy with synkinesis. This patient sustained a laceration of the right medial face including laceration of multiple facial nerve branches nine months prior to this analysis. As shown in the top graph, the patient is moderately able to raise the right oral commissure 209 during a requested smile, but substantially elevates it when closing his eyes tightly, a phenomenon which does not occur on his normal side. The top graph also shows the slightly weaker elevation of the right oral commissure 209 and the failure to drop the mentum 203, which may represent synkinesis. True synkinesis is shown in the lower graph of FIG. 9, in which the patient elevates the right oral commissure 209 while attempting eye closure. The commissure elevation is actually stronger during the synkinetic movement than during the smile itself. The elevation of the mentum 203 during eye closure is also a distinctly abnormal associated (in this case, synkinetic) movement.

Although significantly mobile canthi 11 are not common, on occasion a patient may exhibit mobile canthi 11 during facial movement. Therefore, it is important to observe the patient during maximal brow lift before recording facial images to determine whether the canthi move and measure and correct the final data by this magnitude. In this instance, a direct measurement is made of the canthi movement during maximal brow lift to correct the apparent depression of all markers located below the horizontal axis.

Figure 10A:
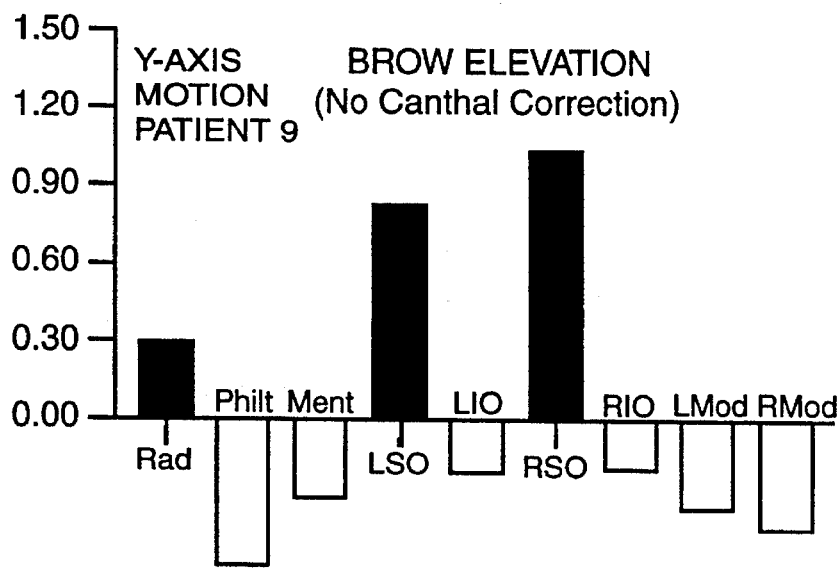
FIG. 10 shows a maximal brow elevation movement profile corrected for a mobile medial canthus.
Figure 10B:
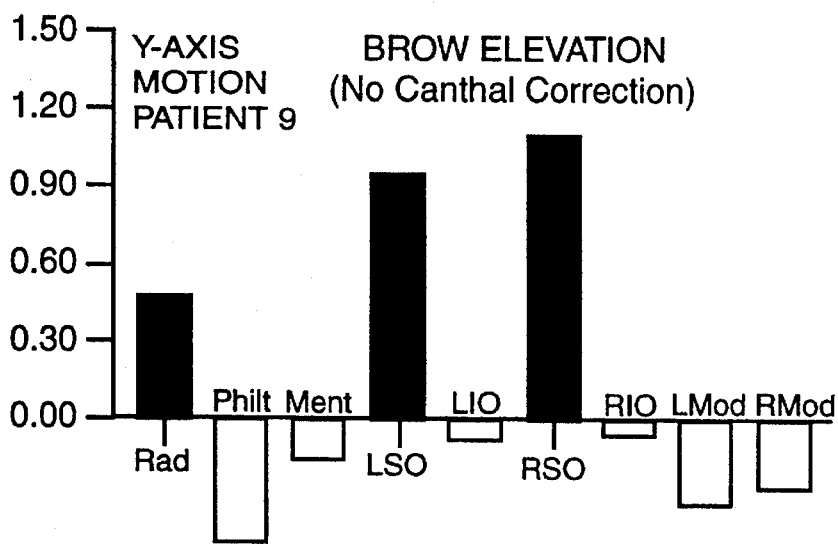

FIG. 10 shows apparent medial canthi movement after maximal brow lift. In this patient, an epicanthal fold and mobile canthi (2 millimeters elevation during maximal brow lift) contributed to an apparent downward movement of the markers which reside below the level of the horizontal axis. A ruler was used to measure the canthi movement during maximal brow lift. The extent of canthi movement was then used to correct the measurements of the markers which appeared to move. The effect of a mobile canthi on facial analysis can be reduced significantly if the horizontal axis of grid is aligned to pass through the lower limbs of the mobile canthi which is relatively immobile during facial movement.

Figure 11A:
FIG. 11 shows a photographic series of functional recovery of facial movement after a patient sustained a gun shot wound to the right of the face.
Figure 11B:
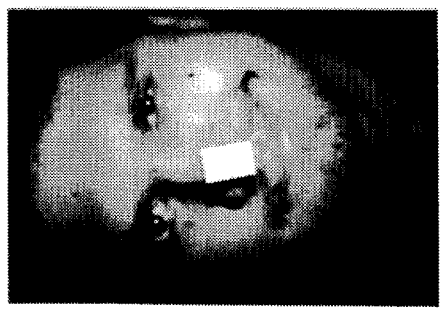
Figure 11:
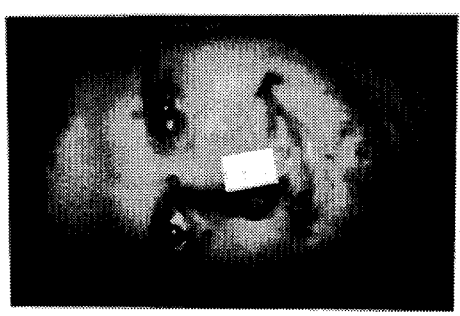
Figure 11D:
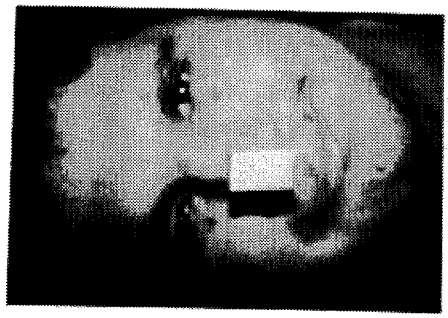
Figure 11E:
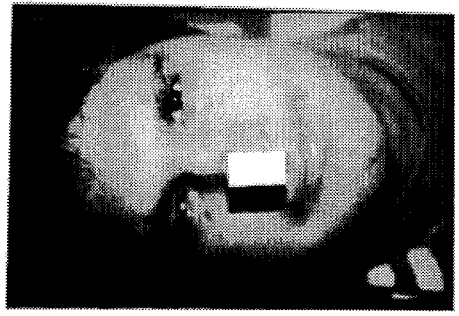
Figure 13:
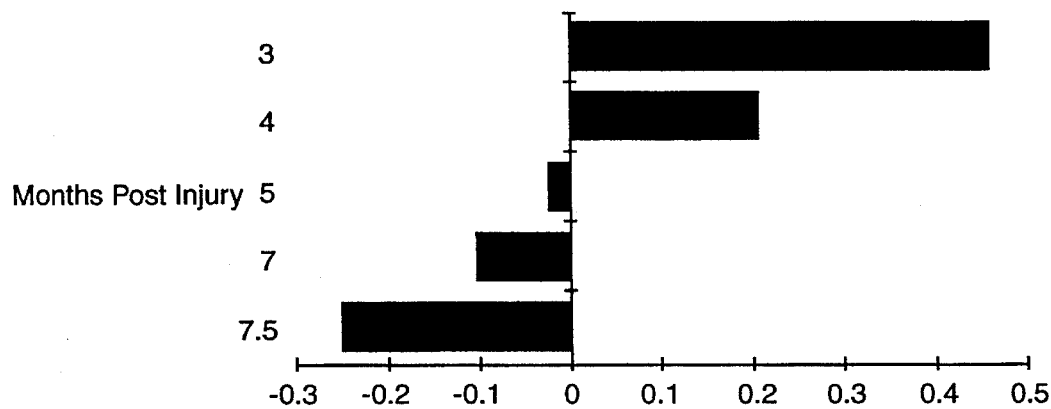
FIG. 13 shows the quantitation of functional recovery of the horizontal movement of the right commissure after facial palsy shown in FIG. 11.
Figure 14:
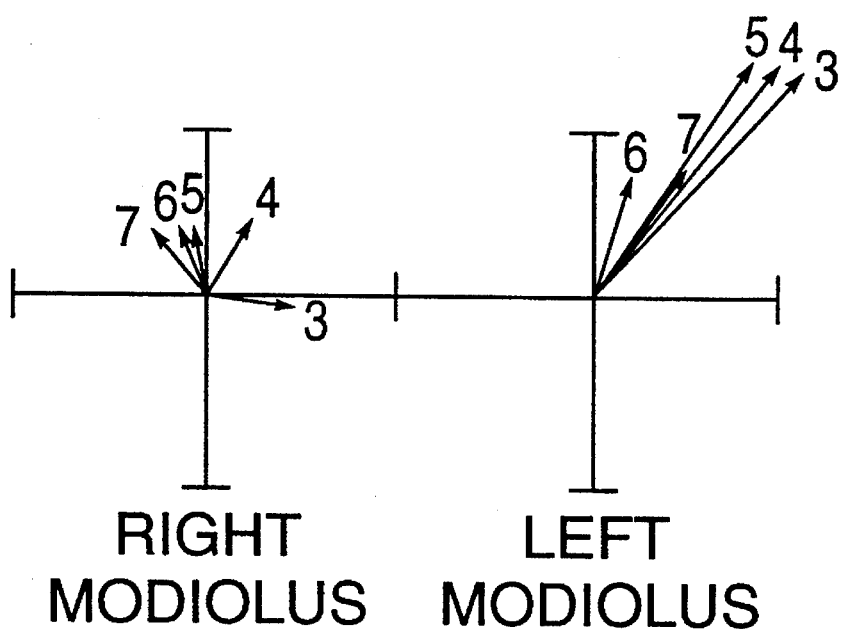
FIG. 14 shows the quantitation of functional recovery of the smile vector after facial palsy shown in FIG. 11.

FIG. 11 shows a photographic series of a 25 year old male who sustained a right facial neurapraxia after a gunshot wound. Specifically, exploration revealed an intact but contused facial nerve and a neurapraxia was evident postoperatively. The recovery of his ability of maximal smile is shown over the third through seventh months after injury. The evident progressive recovery is analyzed in FIGS. 12 and 13 with respect to the different time frames for Y-axis recovery and X-axis recovery, respectively. The vector analysis of his recovery is shown in FIG. 14, which indicates that the direction of pull on the non-involved side remains relatively constant, although excessive in magnitude. Vector analysis has important implications for the planning of reanimation vectors.

Figure 12:
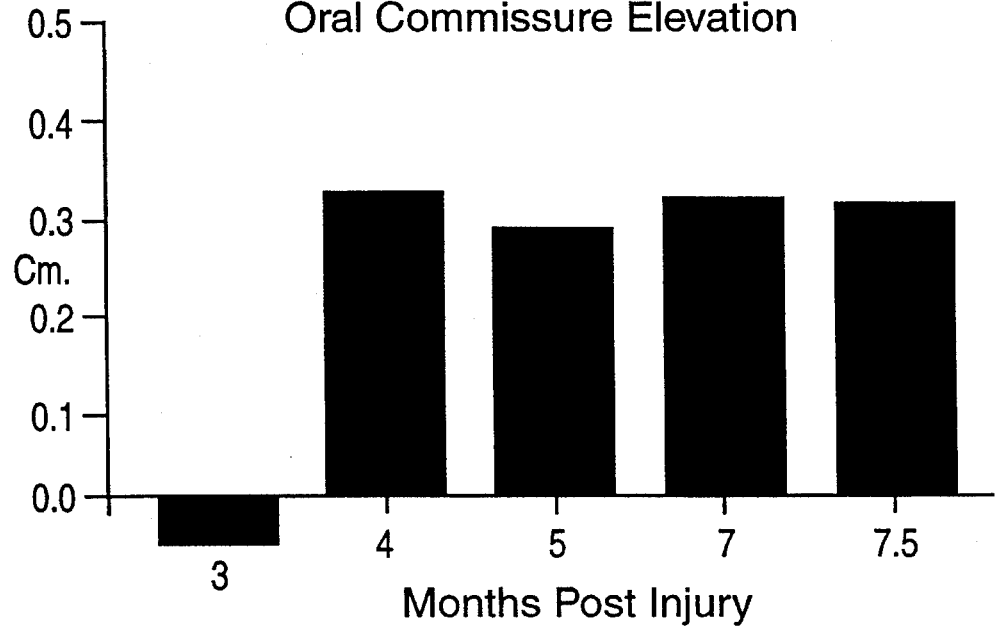
FIG. 12 shows the quantitation of functional recovery of the vertical movement of the right commissure after facial palsy shown in FIG. 11.

As shown in FIG. 12, the change in vertical movement of the right modiolus (right commissure 209) over time is shown for the patient in FIG. 11. Recovery is seen to be complete after four months. The recovery of horizontal movement of the right modiolus (right commissure 209) as a function of post-injury month is shown in FIG. 13. The graph axis is positive when movement is toward the right side and negative when movement is toward the left side. This figure shows that the right corner of the mouth is initially drawn toward the normal side. Recovery of function is sufficient by the fifth month post-injury to neutralize this force. By seven and one-half months post-injury, a significant return of the horizontal movement in the proper (i.e., rightward) direction has been achieved.

The data from FIGS. 12 and 13 can be combined to construct an anteroposterior plane net vector, as shown in FIG. 14 for both the left and right modioli. The Z-component is not included here, since the present concern for this patient is the net vector which is seen when one stands in front of the patient. The tick marks are placed at one centimeter horizontal and vertical intervals. Note that the angular rotation of right modiolar recovery is counterclockwise and that this could also be expressed as number of degrees arc over time as a recovery index. FIG. 14 also shows that the pull of the overactive normal side is in the proper direction but has excess magnitude. This pull direction suggests that the direction of muscle pull during reanimation can be assigned based on the direction of pull of the normal side, even though the normal side is overactive.

The system and method of the present invention were tested on seven healthy, control patients having normal facial function (three men and four women) ages 21–40 (mean 32) and three patients having abnormal facial movements. Three observers at different levels of experience (one plastic surgeon, one surgical resident and one premedical student) assigned location coordinates to each marker using the grid method and the digitizer board method. The first grid 40 used included a grid unit 42 of 4.2 millimeters. The second grid 40 used included a grid unit 42 of 1.0 millimeters. Greater accuracy was achieved by using the 1.0 millimeter grid unit and the digitizer board 68. Each patient's photos were analyzed three times by each observer, thus both intra- and interobserver variation was determined.

The markers used to mark the various facial zones on each patient were red adhesive dots of six millimeters in diameter, as shown in FIG. 1. In the center of each red dot was a black dot of one millimeter in diameter.

Photographs of each patient expressing the desired maximal facial movements were taken with the camera focused on the calibration ruler 30. To determine the amount of photodistortion introduced by focusing on the calibration ruler 30, a study was conducted to determine the correlation between the dimensions of the face 10, as indicated by the calibration ruler 30, and the dimensions which would be indicated by the iris diameter of pupils 13 and 15, respectively. The iris was selected because of its location nearer the plane of reference marker movement in most instances.

The data collected indicated that irises measured by a hand-held held ruler average 1.15±0.03 centimeters (N=18) and irises measured from slides with the ruler as the calibrant averaged 1.08±0.04 centimeters. This data represents a degree of photodistortion/measurement error of −6.3%, a figure which is likely to be acceptable in itself, but which can be improved by using a photographic lens halving an image plane at optical infinity. Given the constancy of the photodistortion/measurement error, however, the error can simply be factored into measurement calculations as a constant, thus reducing the distortion error to within the level of the standard deviation (i.e., 0.3–0.6%; equalling 1–2 SD) which is more acceptable.

Other studies were conducted to determine the constancy of the iris diameter in the slides over time. In six persons, slides were taken over periods of from one to eleven months. When normalized to the average dimensions of their own irises, individual iris measurements showed little variance (1.0±0.023, P=0.91 vs. 1.0, one sample T-test, N=33). Finally, left and right irises from the same patient, when compared as a ratio of left/right were found to be quite similar (1.0± 0.02; P=0.45 vs. 1.0, one sample T-Test, N=13).

Although the iris represents a relatively fixed internal calibrant for the face 10, the calibration ruler 30 remains necessary because in the eye closure facial movement, the iris is not visible.

Individuals vary widely in their patterns and magnitude of facial movement. This feature makes it difficult to assign a "normal range" for facial movement at any point on the face. The amount of variation in facial movement between the seven normal volunteers is shown in Table 3.

TABLE 3

VARIATION IN FACIAL MOVEMENT BETWEEN SEVEN NORMAL INDIVIDUALS

| | X Axis Movement, cm Mean ± SD | Y-Axis Movement, cm Mean ± SD |
|---|---|---|
| RADIX (Brow Lift) | −0.02 ± 0.06 | 0.45 ± 0.24 |
| PHILTRUM (Smile) | 0.04 ± 0.15 | 0.35 ± 0.24 |
| MENTUM (Frown) | −0.03 ± 0.17 | 0.61 ± 0.52 |
| LEFT SUPRAORBITAL (Brow Lift) | 0.18 ± 0.17 | 0.91 ± 0.29 |
| LEFT INFRAORBITAL (Eye Closure) | −0.47 ± 0.3 | 0.3 ± 0.23 |
| RIGHT SUPRAORBITAL (Brow Lift) | −0.25 ± 0.18 | 0.89 ± 0.25 |
| RIGHT INFRAORBITAL (Eye Closure) | 0.53 ± 0.26 | 0.28 ± 0.28 |
| LEFT MODIOLUS (Smile) | 0.73 ± 0.17 | 0.91 ± 0.28 |
| RIGHT MODIOLUS (Smile) | −0.68 ± 0.06 | 0.85 ± 0.19 |

The numeric values represent the averages of the mean and standard deviation of specific facial movements of seven normal subjects, as read three times each by three observers. Significant intersubject variation in movement is demonstrated.

The system and method of the present invention allow the simultaneous measurement of region-specific facial movements in their maximal voluntarily recruited state, the quantitation of loss of facial movement after local or global facial nerve dysfunction, evaluation of facial symmetry at repose and after movement and the detection of synkinesis and other secondary facial defects. Furthermore, the system and method of the invention allow quantitation of the return of facial movement after facial nerve injury or during recovery after facial reanimation procedures. The advantage of the system and method over more rigid craniometric techniques is the ease of data collection at the bedside with no specialized apparatus. The system and method of the invention can also be used as an adjunct to the presently used ordinal scales of facial nerve function, by providing actual quantitation of region-specific facial movement. Lastly, the system and method of the invention can also be used to detect abnormalities in conversational facial motion.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A system for measuring and quantitating movements of a face, the system comprising:

at least one marker applied to at least one specific zone of the face to track motion of the specific zone of the face;

apparatus for recording an image of the marked face at repose and for recording an image of the marked face at at least one selected facial position, said selected position being the result of facial movement;

apparatus for assigning at least one location coordinate to the marker of the facial image at repose and for assigning at least one location coordinate to the marker of the facial image at the selected facial position;

means for converting the location coordinate of the marker to actual positions on the face;

means for determining a change in actual marker position; and means for displaying the change in actual marker position.

2. The system of claim 1 wherein the marker includes an adhesive dot.

3. The system of claim 1 wherein the apparatus for recording facial images is a camera which captures the facial images on film developed into photographs.

4. The system of claim 1 wherein the apparatus for recording facial images is a camera which captures the facial images on film developed into slides; and the system further comprises apparatus for viewing the slides.

5. The system of claim 1 wherein the apparatus for recording facial images is a video camera which captures the facial images on videotape; and the system further comprises apparatus for viewing the videotape.

6. The system of claim rein the apparatus for recording facial images is a compact disc camera which captures the facial images on digitally based media; and the system further comprises apparatus for viewing the digitally based media.

7. The system of claim 1 wherein the apparatus for assigning location coordinates to the marker in the facial images includes a grid in juxtaposition with the facial images whereby the location coordinate is assigned to the marker of each facial image based on the grid orientation.

8. The system of claim 1 wherein the apparatus for assigning location coordinates to the marker in the facial images includes a digitizer computer program;

a data input device; and a digitizer board;

whereby the data input device is selectively aligned with the marker of each facial image and communicates with the digitizer board and the digitizer computer program to assign the location coordinates to the marker.

9. The system of claim 1 wherein the means for converting the location coordinates of the marker of each facial image to actual positions on the face includes a computer spreadsheet.

10. The system of claim 1 wherein the means for determining a change in actual marker position includes a computer spreadsheet.

11. The system of claim 1 wherein the means for displaying the change in actual marker position includes a graph.

12. The system of claim 1 further comprising means positioned pro ate to the face for calibrating the facial images.

13. The system of claim 1 further comprising a calibration ruler positioned proximate to a tip of a nose of the face by positioning means; and a reference marker applied to the nose behind and partially above the calibration ruler such that the reference marker partially appears above the calibration ruler when the face is viewed head-on.

14. A method for measuring and quantitating movements of a face, the method comprising the step of:

applying at least one marker to at least one specific zone of the face to track motion of the specific zone of the face;

recording an image of the marked face at repose and recording an image of the marked face at at least one selected facial position, said selected position being the result of facial movement;

assigning at least one location coordinate to the marker of the facial image at repose and assigning at least one location coordinate to the marker of the facial image at the selected facial position;

converting the location coordinates of the marker to actual positions of the face;

determining a change in actual marker position on the face; and displaying the change in actual marker position on the face.

15. The method of claim 14 further comprising the step of:

centering pupils of the face prior to applying a marker to facial zones including radix, philtrum, mentum, left supraorbital, right supraorbital, left infraorbital, right infraorbital, left oral commissure and right oral commissure zones.

16. The method of claim 14 further comprising the steps of:

prior to recording the facial image at repose, positioning a calibration ruler proximate to a tip of a nose of the face by positioning means;

applying a reference marker to the nose behind and partially above the calibration ruler such that the reference marker partially appears above the calibration ruler when the face is viewed head-on; and focusing on the calibration ruler when recording the facial images.

17. The method of claim 14 wherein the selected facial movement includes maximal brow lift, maximal tight eye closure, maximal smile, maximal frown and maximal mouth pucker.

18. The method of claim 14 herein the step of assigning location coordinates to the marker of each facial image includes the steps of:

juxtapositioning a grid to each facial image so that a horizontal axis of the grid passes through lower limbs of a medial canthi of the facial image and a vertical axis of the grid passes through a perceived center of the bony nasal dorsum of the facial image; and recording location coordinates for each marker of each facial image based on the grid orientation.

19. The method of claim 14 wherein the step of assigning location coordinates to the marker of each facial image includes the steps of:

projecting each facial image onto a digitizer board; and selectively aligning a data input device with the marker of each facial image, the data input device communicating with the digitizer board and a digitizer computer program to assign location coordinates to the marker of each facial image.

20. The method of claim 14 wherein the step of assigning location coordinates to the marker of each facial image includes the steps of:

projecting each facial image onto a computer screen; and selectively aligning a data input device with the marker of each facial image, the data input device communicating with the computer screen and a digitizer computer program to assign location coordinates to the marker of each facial image.

21. The method of claim 14 wherein the step of converting the location coordinates of the marker of each facial image to actual positions on the face includes the step of:

inputting the location coordinates of the marker of each facial image into a computer spreadsheet adapted to calculate the actual position of the marker of each facial image.

22. The method of claim 14 wherein the step of determining a change in actual marker position on the face includes the step of:

inputting the actual marker positions of each facial image into a computer spreadsheet adapted to calculated the change in actual marker position.

23. The method of claim 14 wherein the step of displaying the change in actual marker position on the face includes the step of:

graphing the change in actual marker position.

24. A method for measuring and quantitating movements of a face, the method comprising the steps of:

centering pupils of the face at repose;

applying a marker to a plurality of facial zones including radix, philtrum, mentum, left supraorbital, right supraorbital, left infraorbital, right infraorbital, left oral commissure and right oral commissure zones;

positioning a calibration ruler proximate to a tip of a nose of the face by positioning means, said calibration ruler including at least one calibration unit;

applying a reference marker to the nose behind and partially above the calibration ruler so that the reference marker partially appears above the calibration ruler when the face is viewed head-on;

recording an image of the marked face at repose focused on the calibration ruler using a camera capable of capturing facial images on film for developing slides;

using said camera and focusing on said calibration ruler, recording an image of the marked face at a plurality of selected facial movements including maximal brow lift, maximal tight eye closure, maximal smile, maximal frown and maximal mouth pucker;

developing said facial images into slides;

viewing each facial image slide through a slide viewer;

juxtapositioning a grid to each facial image displayed by the slide viewer so that a horizontal axis of the grid passes through lower limbs of a medial canthi of the facial image and a vertical axis of the grid passes through a perceived center of a bony nasal dorsum of the facial image, said grid including at least one grid unit;

recording location coordinates for each marker of each facial image based on the grid orientation;

calibrating each facial image by placing the grid proximate to the image of the calibration ruler of each facial image so as to determine the number of grid units per calibration unit for that facial image;

converting the location coordinates of each marker to actual positions on the face relative to a trans-canthal/trans-nasal origin formed by the medial canthi and the bony nasal dorsum of the facial image;

determining a change in actual marker position for each marker on the face for each selected facial movement; and graphing the change in actual marker position on the face for each selected facial movement.

25. A method for measuring and quantitating movements of a face, the method comprising the steps of:

centering pupils of the face at repose;

applying a marker to a plurality of facial zones including radix, philtrum, mentum, left supraorbital, right supraorbital, left infraorbital, right infraorbital, left oral commissure and right oral commissure zones;

positioning a calibration ruler proximate to a tip of a nose of the face by positioning means, said calibration ruler including at least one calibration unit;

applying a reference marker to the nose behind and partially above the calibration ruler so that the reference marker partially appears above the calibration ruler when the face is viewed head-on;

recording an image of the marked face at repose focused on the calibration ruler using a camera capable of capturing facial images on film for developing photographs;

using said camera and focusing on said calibration ruler, recording an image of the marked face at a plurality of selected facial movements including maximal brow lift, maximal tight eye closure, maximal smile, maximal frown and maximal mouth pucker;

developing said facial images into photographs;

juxtapositioning a grid to each photograph so that a horizontal axis of the grid passes through lower limbs of a medial canthi of the facial image and a vertical axis of the grid passes through a perceived center of the bony nasal dorsum of the facial image, said grid including at least one grid unit;

recording location coordinates for each marker of each facial image based on the grid orientation;

calibrating each facial image by placing the grid proximate to the image of the calibration ruler of each facial image so as to determine the number of grid units per calibration unit for that facial image;

converting the location coordinates of each marker to actual positions on the face relative to a trans-canthal/trans-nasal origin formed by the medial canthi and the bony nasal dorsum of the facial image;

determining a change in actual marker position for each marker on the face for each selected facial movement; and graphing the change in actual marker position on the face for each selected facial movement.

26. A method for measuring and quantitating movements of a face, the method comprising the steps of:

centering pupils of the face at repose;

applying a marker to a plurality of facial zones including radix, philtrum, mentum, left supraorbital, right supraorbital, left infraorbital, right infraorbital, left oral commissure and right oral commissure zones;

positioning a calibration ruler proximate to a tip of a nose of the face by positioning means, said calibration ruler including at least one calibration unit;

applying a reference marker to the nose behind and partially above the calibration ruler so that the reference marker partially appears above the calibration ruler when the face is viewed head-on;

recording an image of the marked face at repose focused on the calibration ruler using a video camera capable of capturing facial images on videotape;

using said video camera and focusing on said calibration ruler, recording an image of the marked face at a plurality of selected facial movements including maximal brow lift, maximal tight eye closure, maximal smile, maximal frown and maximal mouth pucker;

viewing each facial image by using a videotape player;

juxtapositioning a grid to each facial image displayed by the videotape player so that a horizontal axis of the grid passes through lower limbs of a medial canthi of the facial image and a vertical axis of the grid passes through a perceived center of the bony nasal dorsum of the facial image, said grid including at least one grid unit;

recording location coordinates for each marker of each facial image based on the grid orientation;

calibrating each facial image by placing the grid proximate to the image of the calibration ruler of each facial image so as to determine the number of grid units per calibration unit for that facial image;

converting the location coordinates of each marker to actual positions on the face relative to a trans-canthal/trans-nasal origin formed by the medial canthi and the bony nasal dorsum of the facial image;

determining a change in actual marker position for each marker on the face for each selected facial movement; and graphing the change in actual marker position on the face for each selected facial movement.

27. A method for measuring and quantitating movements of a face, the method comprising the steps of:

centering pupils of the face at repose;

applying a marker to a plurality of facial zones including radix, philtrum, mentum, left supraorbital, right supraorbital, left infraorbital, right infraorbital, left oral commissure and right oral commissure zones;

positioning a calibration ruler proximate to a tip of a nose of the face by positioning means, said calibration ruler including at least one calibration unit;

applying a reference marker to the nose behind and partially above the calibration ruler so that the reference marker partially appears above the calibration ruler when the face is viewed head-on;

recording an image of the marked face at repose focused on the calibration ruler using a compact disc camera capable of capturing facial images on digitally based media;

using said compact disc camera and focusing on said calibration ruler, recording an image of the marked face at a plurality of selected facial movements including maximal brow lift, maximal tight eye closure, maximal smile, maximal frown and maximal mouth pucker;

viewing each facial image by using a computer having a computer screen;

juxtapositioning a grid to each facial image displayed on the computer screen so that a horizontal axis of the grid passes through lower limbs of a medial canthi of the facial image and a vertical axis of the grid passes through a perceived center of the bony nasal dorsum of the facial image, said grid including at least one grid unit;

recording location coordinates for each marker of each facial image based on the grid orientation;

calibrating each facial image by placing the grid proximate to the image of the calibration ruler of each facial image so as to determine the number of grid units per calibration unit for that facial image;

converting the location coordinates of each marker to actual positions on the face relative to a trans-canthal/trans-nasal origin formed by the medial canthi and the bony nasal dorsum of the facial image;

determining a change in actual marker position for each marker on the face for each selected facial movement; and graphing the change in actual marker position on the face for each selected facial movement.

28. A method for measuring and quantitating movements of a face, the method comprising the steps of:

centering pupils of the face at repose;

applying a marker to a plurality of facial zones including radix, philtrum, mentum, left supraorbital, right supraorbital, left infraorbital, right infraorbital, left oral commissure and right oral commissure zones;

positioning a calibration ruler proximate to a tip of a nose of the face by positioning means;

applying a reference marker to the nose behind and partially above the calibration ruler so that the reference marker partially appears above the calibration ruler when the face is viewed head-on;

recording an image of the marked face at repose focused on the calibration ruler using a camera capable of capturing facial images on film for developing slides;

using said camera and focusing on said calibration ruler, recording an image of the marked face at a plurality of selected facial movements including maximal brow lift, maximal tight eye closure, maximal smile, maximal frown and maximal mouth pucker;

developing said facial images into slides;

projecting each facial image slide onto a digitizer board so that the calibration ruler is projected to its original size;

calibrating the digitizer board;

selectively aligning a data input device with each marker of each projected facial image, the data input device communicating with a digitizer computer program and the digitizer board to assign actual marker positions to each marker of each facial image;

using an adapted computer spreadsheet to determine a change in actual marker position for each marker on the face for each selected facial movement; and graphing the change in actual marker position on the face for each selected facial movement.

29. A method for measuring and quantitating movements of a face, the method comprising the steps of:

centering pupils of the face at repose;

applying a marker to a plurality of facial zones including radix, philtrum, mentum, left supraorbital, right supraorbital, left infraorbital, right infraorbital, left oral commissure and right oral commissure zones;

positioning a calibration ruler proximate to a tip of a nose of the face by positioning means;

applying a reference marker to the nose behind and partially above the calibration ruler so that the reference marker partially appears above the calibration ruler when the face is viewed head-on;

recording an image of the marked face at repose focused on the calibration ruler using a camera capable of capturing facial images on digitally based media;

using said camera and focusing on said calibration ruler, recording an image of the marked face at a plurality of selected facial movements including maximal brow lift, maximal tight eye closure, maximal smile, maximal frown and maximal mouth pucker;

projecting each facial image onto a computer screen so that the calibration ruler is projected to its original size;

calibrating the computer screen;

selectively aligning a data input device with each marker of each projected facial image, the data input device communicating with a digitizer computer program and the computer screen to assign actual marker positions to each marker of each facial image;

using an adapted computer spreadsheet to determine a change in actual marker position for each marker on the face for each selected facial movement; and graphing the change in actual marker position on the face for each selected facial movement.

* * * * *

UNITED STATES PATENT AND TRADEMARK OFFICE
CERTIFICATE OF CORRECTION

PATENT NO. : 5,482,048
DATED : January 9, 1996
INVENTOR(S) : Johnson

It is certified that error appears in the above-identified patent and that said Letters Patent is hereby corrected as shown below:

Column 15, line 26 (i.e. line 1 of Claim 6), delete 'rein' and substitute therefor --1 wherein--.

Column 15, line 57 (i.e. line 2 of Claim 12), delete 'pro ate' and substitute therefor --proximate--.

Column 16, line 15 (i.e. line 15 of Claim 14), delete 'of' and substitute therefor --on--.

Signed and Sealed this

First Day of April, 1997

BRUCE LEHMAN

Attest:

Attesting Officer

Commissioner of Patents and Trademarks